(12) United States Patent
Nielsen et al.

(10) Patent No.: US 9,933,843 B2
(45) Date of Patent: Apr. 3, 2018

(54) SYSTEMS AND METHODS FOR REDUCING ENERGY STORAGE REQUIREMENTS IN A DATA CENTER

(75) Inventors: Torben Nielsen, Odense (DK); Flemming Johansen, Kolding (DK); Jens Engsted Kiib, Kolding (DK); Mikkel Dalgas, Hejls (DK); Kresten Peter Vester, Kolding (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 14/366,499

(22) PCT Filed: Dec. 22, 2011

(86) PCT No.: PCT/US2011/066832
§ 371 (c)(1),
(2), (4) Date: Jun. 18, 2014

(87) PCT Pub. No.: WO2013/095505
PCT Pub. Date: Jun. 27, 2013

(65) Prior Publication Data
US 2014/0365795 A1 Dec. 11, 2014

(51) Int. Cl.
*G06F 1/32* (2006.01)
*G06F 1/30* (2006.01)
(Continued)

(52) U.S. Cl.
CPC .............. *G06F 1/329* (2013.01); *G06F 1/30* (2013.01); *G06F 9/45533* (2013.01);
(Continued)

(58) Field of Classification Search
CPC .. G06F 1/30; G06F 1/329; G06F 2009/45575; G06F 9/45533; G06F 9/45558
See application file for complete search history.

(56) References Cited

U.S. PATENT DOCUMENTS 4,868,832 A * 9/1989 Marrington ......... G06F 11/2015
365/229
5,845,090 A 12/1998 Collins, III et al.
(Continued)

FOREIGN PATENT DOCUMENTS

| CN | 101098075 A | 1/2008 |
| WO | 2013095505 A1 | 6/2013 |
| WO | 2015106039 A1 | 7/2015 |

OTHER PUBLICATIONS

Extended European Search Report from PCT/US2011/066832 dated May 3, 2016.
(Continued)

*Primary Examiner* — Thomas Lee
*Assistant Examiner* — Chad Erdman
(74) *Attorney, Agent, or Firm* — Lando & Anastasi, LLP

(57) ABSTRACT

A method for reducing a need for power in a backup mode of operation in a data center includes receiving a first alert from an uninterruptible power supply indicating that the uninterruptible power supply is operating in a first mode, wherein the first mode includes deriving power from a stored energy source, identifying at least one host server configured to receive power from the uninterruptible power supply in the first mode, suspending execution of at least one virtual machine on the at least one host server, receiving a second alert from the uninterruptible power supply indicating that the uninterruptible power supply is operating in a second mode, wherein the second mode includes deriving power from one of a mains power source and a generator, and resuming execution of the at least one virtual machine.

18 Claims, 5 Drawing Sheets

(51) Int. Cl.
   *G06F 9/455*    (2018.01)
   *G06F 9/48*     (2006.01)
   *H02J 9/00*     (2006.01)

(52) U.S. Cl.
   CPC ........ *G06F 9/45558* (2013.01); *G06F 9/4893* (2013.01); *G06F 2009/45575* (2013.01); *H02J 9/002* (2013.01); *Y02B 60/144* (2013.01)

(56) References Cited

U.S. PATENT DOCUMENTS

| | | | |
|---|---|---|---|
| 5,978,594 | A | 11/1999 | Bonnell et al. |
| 7,146,353 | B2 | 12/2006 | Garg et al. |
| 7,197,433 | B2 | 3/2007 | Patel et al. |
| 7,389,403 | B1 | 6/2008 | Alpert et al. |
| 7,432,617 | B2 | 10/2008 | Kanouda et al. |
| 7,451,336 | B2 | 11/2008 | Manuell et al. |
| 7,502,333 | B2 | 3/2009 | Modi et al. |
| 8,121,940 | B2 | 2/2012 | Haggerty et al. |
| 8,335,703 | B1 | 12/2012 | Pulier et al. |
| 8,674,823 | B1* | 3/2014 | Contario ............ H02J 1/10 340/333 |
| 2003/0200295 | A1 | 10/2003 | Roberts et al. |
| 2003/0236822 | A1 | 12/2003 | Graupner et al. |
| 2004/0010569 | A1 | 1/2004 | Thomas et al. |
| 2004/0230848 | A1 | 11/2004 | Mayo et al. |
| 2005/0055590 | A1 | 3/2005 | Farkas et al. |
| 2005/0086544 | A1 | 4/2005 | Egan et al. |
| 2005/0114507 | A1 | 5/2005 | Tarui et al. |
| 2005/0228618 | A1 | 10/2005 | Patel et al. |
| 2005/0251802 | A1 | 11/2005 | Bozek et al. |
| 2006/0112286 | A1 | 5/2006 | Whalley et al. |
| 2007/0067435 | A1 | 3/2007 | Landis et al. |
| 2007/0088822 | A1 | 4/2007 | Coile et al. |
| 2007/0150584 | A1 | 6/2007 | Srinivasan |
| 2007/0234077 | A1 | 10/2007 | Rothman et al. |
| 2007/0271475 | A1 | 11/2007 | Hataseki et al. |
| 2008/0104587 | A1 | 5/2008 | Magenheimer et al. |
| 2008/0177424 | A1 | 7/2008 | Wheeler |
| 2008/0229318 | A1 | 9/2008 | Franke |
| 2008/0294917 | A1* | 11/2008 | Khan ............ G06F 1/3209 713/310 |
| 2009/0037030 | A1 | 2/2009 | Chidambaram et al. |
| 2009/0106409 | A1 | 4/2009 | Murata |
| 2009/0113060 | A1 | 4/2009 | Jacob et al. |
| 2009/0121547 | A1 | 5/2009 | Paik et al. |
| 2009/0187782 | A1 | 7/2009 | Greene et al. |
| 2009/0189774 | A1 | 7/2009 | Brundridge et al. |
| 2009/0204826 | A1 | 8/2009 | Cox et al. |
| 2009/0249354 | A1 | 10/2009 | Yamaguchi et al. |
| 2009/0276771 | A1 | 11/2009 | Nickolov et al. |
| 2010/0023940 | A1* | 1/2010 | Iwamatsu ......... G06F 1/3203 718/1 |
| 2010/0026974 | A1 | 2/2010 | Wiener et al. |
| 2010/0111112 | A1 | 5/2010 | Bickel |
| 2010/0131957 | A1 | 5/2010 | Kami |
| 2010/0141046 | A1 | 6/2010 | Paik |
| 2010/0145884 | A1 | 6/2010 | Paik |
| 2010/0191854 | A1 | 7/2010 | Isci et al. |
| 2010/0211669 | A1 | 8/2010 | Dalgas et al. |
| 2010/0211810 | A1 | 8/2010 | Zacho |
| 2011/0018342 | A1 | 1/2011 | Park et al. |
| 2011/0035611 | A1 | 2/2011 | Brey et al. |
| 2011/0072430 | A1 | 3/2011 | Mani |
| 2011/0078474 | A1 | 3/2011 | Hataseki et al. |
| 2011/0099403 | A1 | 4/2011 | Miyata et al. |
| 2011/0107332 | A1 | 5/2011 | Bash |
| 2011/0187197 | A1 | 8/2011 | Moth |
| 2011/0202728 | A1 | 8/2011 | Nichols et al. |
| 2011/0239010 | A1* | 9/2011 | Jain .............. G06F 1/3209 713/310 |
| 2011/0282982 | A1 | 11/2011 | Jain |
| 2011/0320556 | A1 | 12/2011 | Reuther |
| 2012/0036383 | A1 | 2/2012 | Iwata |
| 2012/0098343 | A1* | 4/2012 | Harris .............. G06F 1/183 307/48 |
| 2012/0137289 | A1* | 5/2012 | Nolterieke ....... G06F 9/45558 718/1 |
| 2012/0192007 | A1* | 7/2012 | Weilnau, Jr. ........ G06F 1/30 714/14 |
| 2013/0116946 | A1 | 5/2013 | Familiant et al. |
| 2013/0247048 | A1* | 9/2013 | Le Saux ......... G06F 1/3203 718/1 |
| 2014/0215073 | A1 | 7/2014 | Dow et al. |
| 2014/0310719 | A1 | 10/2014 | Egner et al. |
| 2014/0337832 | A1 | 11/2014 | Adogla |
| 2014/0337833 | A1 | 11/2014 | Adogla |
| 2014/0337834 | A1 | 11/2014 | Adogla |
| 2015/0128052 | A1 | 5/2015 | Grehan et al. |
| 2016/0234073 | A1 | 8/2016 | Maes |

OTHER PUBLICATIONS

International Search Report from corresponding PCT/US2011/066832 dated May 3, 2012.

K. Dunlap, "Cooling Audit for Identifying Potential Cooling Problems in Data Centers", White Paper #40, pp. 1-18, American Power Conversion, May 20, 2004, published on World Wide Web.

N. Rasmussen, "Calculating Total Cooling Requirements for Data Centers", White Paper #25, pp. 1-8, American Power Conversion, May 20, 2004, published on World Wide Web.

N. Rasmussen, "Cooling Strategies for Ultra-High Density Racks and Blade Servers", White Paper #46, pp. 1-22, American Power Conversion, Mar. 29, 2005, published on World Wide Web.

N. Rasmussen, "Strategies for Deploying Blade Servers in Existing Data Centers", White Paper #125, pp. 1-14, American Power Conversion, Mar. 29, 2005, published on World Wide Web.

Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.

S. Niles: "Virtualization: Optimized Power and Cooling to Maximize Benefits", Feb. 4, 2009 (Feb. 4, 2009), pp. 1-27, CP002664678.

* cited by examiner

SYSTEMS AND METHODS FOR REDUCING ENERGY STORAGE REQUIREMENTS IN A DATA CENTER

This application is a U.S. National Stage Application under 35 U.S.C. § 371 from International Application No. PCT/US2011/066832, filed Dec. 22, 2011, which is hereby incorporated by reference in its entirety for all purposes.

BACKGROUND

An Uninterruptible Power Supply (UPS) may be installed in a data center to provide back-up power in case of a mains power failure. The UPS is typically configured to provide sufficient power to allow the data center equipment to continue running while a generator is started. Lead-acid batteries are generally used to provide back-up power to the data center equipment. Lead-acid batteries are cheaper than other energy storage systems, and in UPS applications, lead-acid batteries are typically sized to provide enough power to allow the data center equipment to continue to run for a sufficient period of time to start a generator.

SUMMARY

Systems and methods are provided for reducing backup energy storage requirements in a data center. In one embodiment, to benefit from energy storage systems other than lead-acid batteries, such as supercapacitors and flywheels, and to implement other energy storage systems at a price comparable to the price of lead-acid batteries, systems and methods are provided to reduce the amount of stored energy required in a UPS. In one embodiment, systems and methods are provided for reducing the amount of energy used by data center equipment when back-up power is in use. In one example, the execution of virtual machines is suspended when back-up power is in use.

According to one aspect, a method for reducing a need for stored power in a backup mode of operation in a data center includes receiving a first alert from an uninterruptible power supply indicating that the uninterruptible power supply is operating in a first mode, wherein the first mode includes deriving power from a stored energy source, identifying at least one host server configured to receive power from the uninterruptible power supply in the first mode, suspending execution of at least one virtual machine on the at least one host server, receiving a second alert from the uninterruptible power supply indicating that the uninterruptible power supply is operating in a second mode, wherein the second mode includes deriving power from one of a mains power source and a generator, and resuming execution of the at least one virtual machine.

According to one embodiment, the method also includes, in response to the first alert, migrating operations on the at least one host server to at least one second host server. In another embodiment, the method includes activating a power-capping process in the at least one host server. In a further embodiment, the at least one virtual machine includes a plurality of virtual machines, and the method includes calculating a level of importance for each of the plurality of virtual machines, and suspending execution of a portion of the plurality of virtual machines, based on the level of importance of each virtual machine.

In one embodiment, deriving power from a stored energy source includes deriving power from one of a super capacitor, a lithium ion battery, a flywheel energy source, and a lead-acid battery. In another embodiment, identifying at least one host server configured to receive power from the uninterruptible power supply in the first mode includes identifying at least one host server having a frequency-scaling processor.

According to one aspect, a system for reducing a need for power in a backup mode of operation in a data center includes an uninterruptible power supply including a stored energy source, a plurality of host servers, each host server including at least one virtual machine and a controller coupled to the uninterruptible power supply and the plurality of host servers. The controller is configured to receive a first alert from the uninterruptible power supply indicating that the uninterruptible power supply is operating in a first mode, wherein the first mode includes deriving power from the stored energy source, identify at least one of the plurality of host servers configured to receive power from the uninterruptible power supply in the first mode, and suspend execution of at least one virtual machine on the at least one of the plurality of host servers.

According to one embodiment, the controller is further configured to receive a second alert from the uninterruptible power supply indicating that the uninterruptible power supply is operating in a second mode, wherein the second mode includes deriving power from one of a mains power source and a generator, and resume execution of the at least one virtual machine. In another embodiment, the controller is further configured, in response to the first alert, to migrate operations on the at least one host server to at least one second host server. In a further embodiment, the controller is further configured, in response to the first alert, to migrate operations on the at least one host server to at least one second host server. In another embodiment, the controller is further configured to activate a power-capping process in the at least one host server.

In one embodiment, the at least one virtual machine includes a plurality of virtual machines, and the controller is further configured to calculate a level of importance for each of the plurality of virtual machines, and suspend execution of a portion of the plurality of virtual machines, based on the level of importance of each virtual machine. In another embodiment, the at least one host server has a frequency-scaling processor. In one embodiment, the stored energy source is one of a super capacitor, a lithium-ion based energy source, a flywheel energy source, and a lead-acid battery.

According to another aspect, a computer readable medium has stored thereon sequences of instruction for reducing a need for power in a backup mode of operation including instructions that will cause a processor to receive a first alert from an uninterruptible power supply indicating that the uninterruptible power supply is operating in a first mode, wherein the first mode includes deriving power from a stored energy source, identify at least one of the plurality of host servers configured to receive power from the uninterruptible power supply in the first mode, and suspend execution of at least one virtual machine on the at least one of the plurality of host servers.

In one embodiment, the computer readable medium also includes instructions that will cause the processor to receive a second alert from the uninterrupted power supply indicating that the uninterrupted power supply is operating in a second mode, wherein the second mode includes deriving power from one of a mains power source and a generator, and resume execution of the at least one virtual machine. In another embodiment, the computer readable medium also includes instructions that will cause the processor, in response to the first alert, to migrate operations on the at least one host server to at least one second host server. In a further embodiment, the computer readable medium also includes instructions that will cause the processor to activate a power-capping process in the at least one host server.

According to one embodiment, the at least one virtual machine includes a plurality of virtual machines, and includes instructions that will cause the processor to calculate a level of importance for each of the plurality of virtual machines, and suspend execution of a portion of the plurality of virtual machines, based on the level of importance of each virtual machine. According to another embodiment, deriving power from a stored energy source includes deriving power from one of a super capacitor, a lithium ion battery, a flywheel energy source, and a lead-acid battery.

BRIEF DESCRIPTION OF THE FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
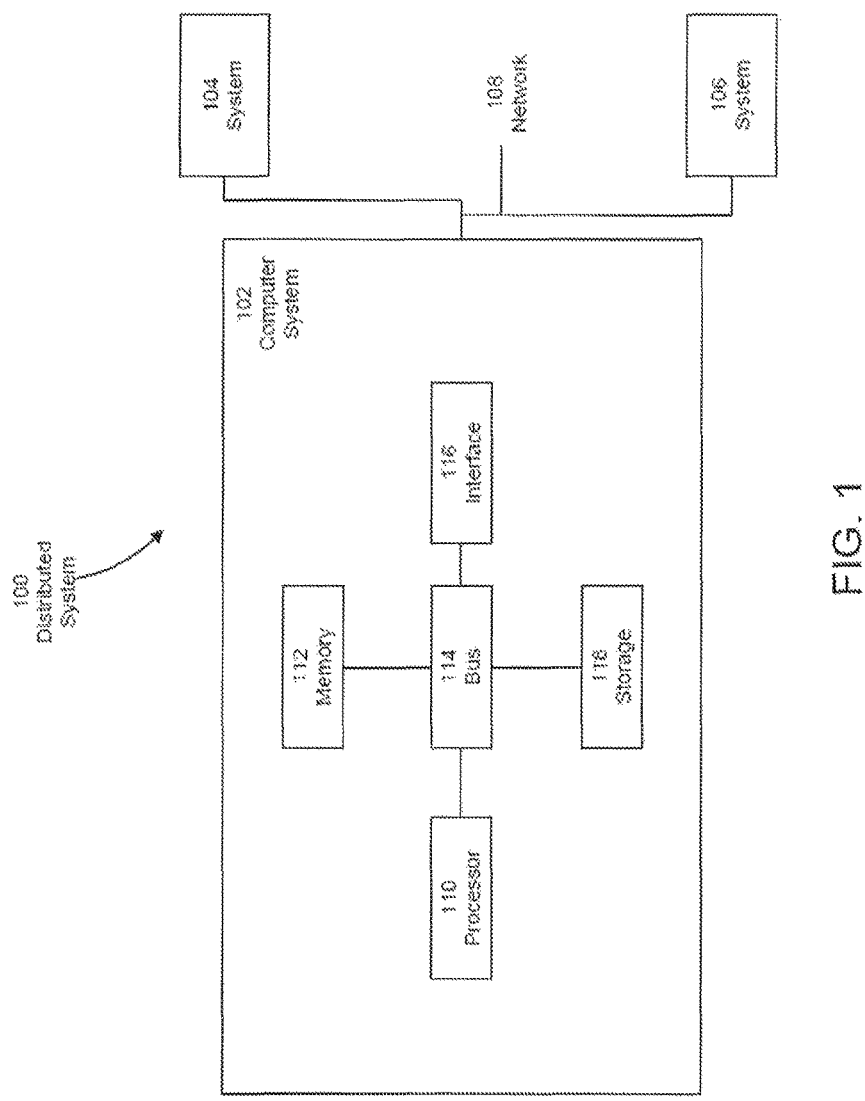
FIG. 1 is a block diagram of one example of a computer system with which various aspects in accord with the present invention may be implemented.

At least some embodiments relate to systems and methods for reducing backup storage requirements in a data center. In one embodiment, systems and methods are provided for reducing the amount of energy used by data center equipment when operating from backup power by suspending execution of one or more virtual machines executing on the equipment. According to one feature, reducing the amount of energy used by data center equipment when the equipment loses mains power reduces the amount of energy backup storage needed in the data center. Furthermore, when a data center uses less stored energy upon mains failure, different types of stored energy devices may be used, such as stored energy modules that provide less overall stored energy.

There are several systems and methods known for reducing energy used in computing equipment. One method for reducing the energy used by a host server includes frequency-scaling the central processing unit. Frequency scaling of a CPU lowers the operating frequency of the CPU, and thus the power draw of the CPU. By decreasing the operating frequency of a CPU when computational load is decreased, the CPU will draw less power.

Another method of reducing the energy used by selected host servers includes migrating operations from the selected host servers to other servers. However, while migrating operations results in less power draw for the selected host servers, the migration operation can draw significant amounts of power. Further, for the migration to occur, powered servers having capacity must be available.

A further method of reducing the energy used by servers is power-capping, which allows a user to limit the maximum power draw of a server to a specific value. While power-capping can be used to lower the power usage of servers that are powered by a UPS, power-capping technology does not detect which servers are impacted by a power failure, or calculate the power-failure impact on specific servers.

A software-based method for reducing energy used by selected servers in accordance with one embodiment includes detecting which servers have lost mains power and are operating on stored energy, and suspending the execution of one or more virtual machines running on the detected servers. Suspending the execution of one or more virtual machines on a server lowers the power draw of the server, resulting in a higher stored energy runtime.

Any of the systems or methods disclosed herein may be used in combination to further reduce energy usage of one or more servers, thereby decreasing the amount of stored energy needed in case of a power mains failure. For example, the UPS load may be lowered by switching off or power-capping servers in accordance with Service Level Agreements, and the deployment of virtual machines may be managed to ensure compliance with a Service Level Agreement's required runtime of each virtual machine.

The aspects and embodiments of the present invention disclosed herein are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, detecting a mains power failure, determining the power draw of various servers and suspending the execution of one or more virtual machines on selected servers. Further, computer systems in embodiments may be used to automatically monitor power usage of servers in a data center. Moreover, the systems described herein may be configured to include or exclude any of the functions discussed herein. Thus the embodiments are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

FIG. 1 shows a block diagram of a distributed computer system 100, in which various aspects and functions in accord with the present embodiments may be practiced. Distributed computer system 100 may include one more computer systems. For example, as illustrated, distributed computer system 100 includes computer systems 102, 104, and 106. As shown, computer systems 102, 104, and 106 are interconnected by, and may exchange data through, communication network 108. Network 108 may include any communication network through which computer systems may exchange data. To exchange data using network 108, computer systems 102, 104, and 106 and network 108 may use various methods, protocols and standards, including, among others, token ring, Ethernet, wireless Ethernet, Bluetooth, TCP/IP, UDP, Http, FTP, SNMP, SMS, MMS, SS7,Json, Soap, and Corba. To ensure data transfer is secure, computer systems 102, 104, and 106 may transmit data via network 108 using a variety of security measures including TLS, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present embodiments may be implemented as specialized hardware or software executing in one or more computer systems including computer system 102 shown in FIG. 1. As depicted, computer system 102 includes processor 110, memory 112, bus 114, interface 116, and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor, multi-processor, microprocessor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile, non-transitory, storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI and InfiniBand. Thus, bus 114 enables communications, for example, data and instructions, to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems. Storage system 118 may include a computer readable and writeable, nonvolatile, non-transitory, storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk, or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then may copy the data to the medium associated with storage system 118 after processing is completed. A variety of components may manage data movement between the medium and integrated circuit memory element and the presently described embodiments are not limited thereto. Further, the embodiments are not limited to a particular memory system or data storage system.

Although computer system 102 is shown by way of example as one type of computer system upon which various aspects and functions in accordance with the present embodiments may be practiced, any aspects of the presently disclosed embodiments are not limited to being implemented on the computer system as shown in FIG. 1. Various aspects and functions in accord with the presently disclosed embodiments may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system such as Windows NT, Windows 2000 (Windows ME), Windows XP, or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

Example System Architecture

Figure 2:
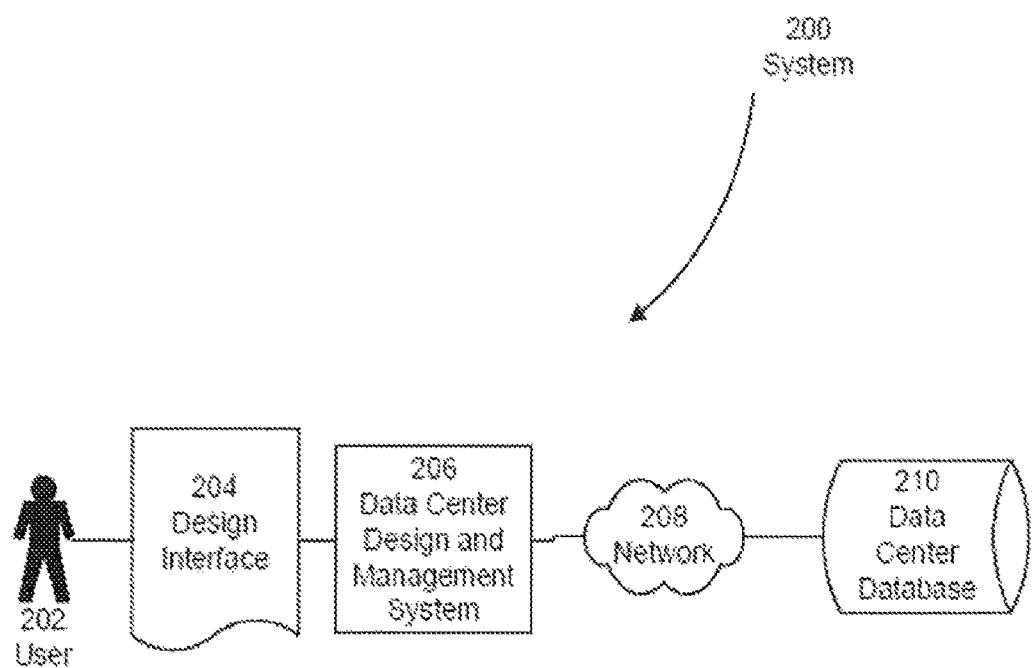
FIG. 2 a schematic of one example of a distributed system including a data center management system.

FIG. 2 presents a context diagram including physical and logical elements of distributed system 200. As shown, distributed system 200 is specially configured in accordance with the presently disclosed embodiments and may be used to control servers in a data center in accordance with methods described herein. The system structure and content recited with regard to FIG. 2 is for exemplary purposes only and is not intended to limit the embodiments to the specific structure shown in FIG. 2. As will be apparent to one of ordinary skill in the art, many variant system structures can be architected without deviating from the scope of the presently disclosed embodiments. The particular arrangement presented in FIG. 2 was chosen to promote clarity.

Information may flow between the elements, components and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the presently disclosed embodiments.

Referring to FIG. 2, system 200 includes user 202, interface 204, data center design and management system 206, communications network 208, and data center database 210. System 200 may allow user 202, such as a data center architect or other data center personnel, to interact with interface 204 to create or modify a model of one or more data center configurations. According to one embodiment, interface 204 may include aspects of the floor editor and the rack editor as disclosed in Patent Cooperation Treaty Application No. PCT/US08/63675, titled "Methods and Systems for Managing Facility Power and Cooling," filed on May 15, 2008, which is incorporated herein by reference in its entirety and is hereinafter referred to as PCT/US08/63675. In at least one embodiment, information regarding a data center is entered into system 200 through the interface, and assessments and recommendations for the data center are provided to the user. Further, in at least one embodiment, optimization processes may be performed to optimize cooling performance and energy usage of the data center.

As shown in FIG. 2, data center design and management system 206 presents data design interface 204 to user 202. According to one embodiment, data center design and management system 206 may include the data center design and management system as disclosed in PCT/US08/63675. In this embodiment, design interface 204 may incorporate functionality of the input module, the display module and the builder module included in PCT/US08/63675 and may use the database module to store and retrieve data. As illustrated, data center design and management system 206 may exchange information with data center database 210 via network 208. This information may include any information needed to support the features and functions of data center design and management system 206. For example, in one embodiment, data center database 210 may include at least some portion of the data stored in the data center equipment database described in PCT/US08/63675. In another embodiment, this information may include any information needed to support interface 204, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, embodiments of the invention are not limited to a specific number of users or systems.

Figure 3:
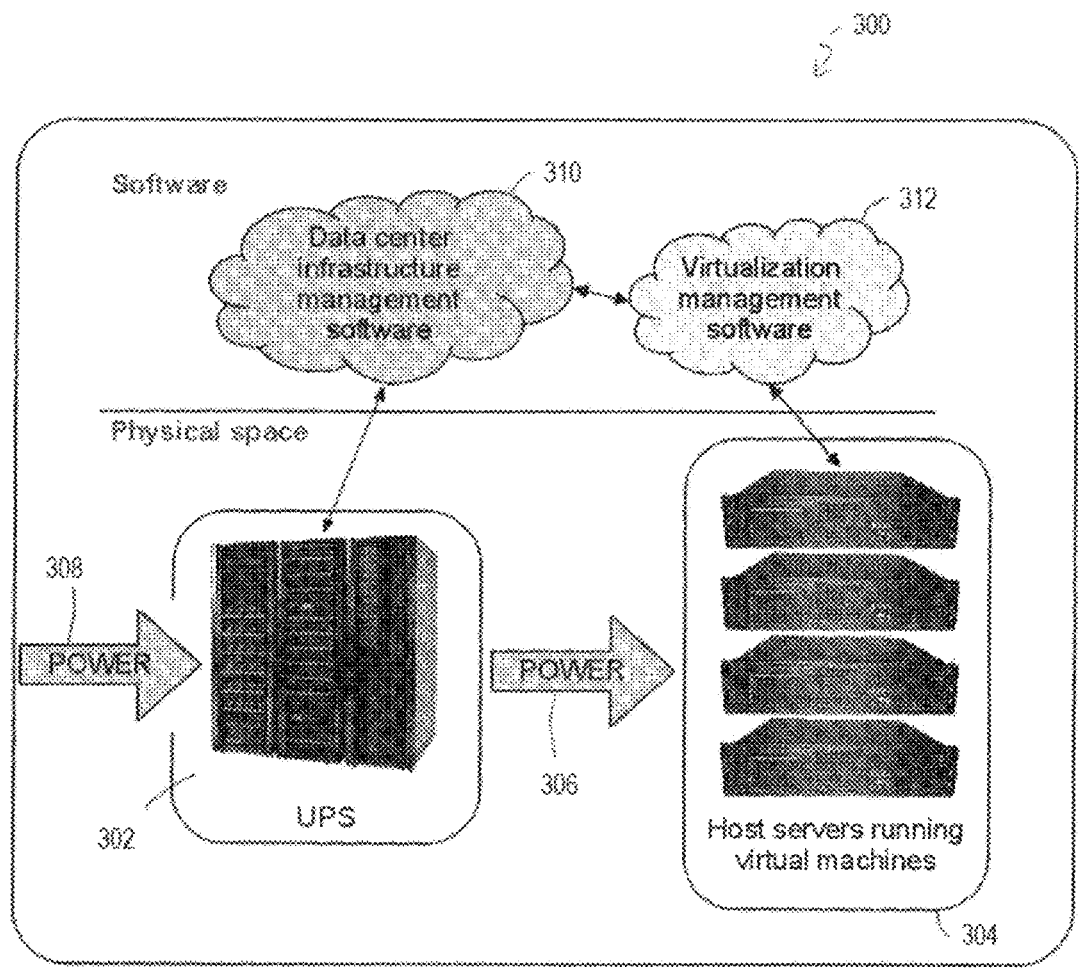
FIG. 3 is a schematic block diagram showing an uninterruptible power supply providing power to data center servers.

FIG. 3 is a schematic block diagram 300 showing an uninterruptible power supply (UPS) 302 receiving input power 308 and providing power 306 to data center servers 304 in a data center. In various examples, the input power 308 may be mains power or it may be generator power. Data center infrastructure management software 312, operating for example on a management server in the data center, monitors the UPS 302.

Virtualization management software 312 manages and monitors virtual machines running on the data center servers 304. The data center infrastructure management software 310 is integrated with the virtualization infrastructure management software 312, with the data center infrastructure management software 310 communicating with, and exchanging information with, the virtualization infrastructure management software 312 over existing network protocols (for example, TCP/IP-based web services).

Figure 4:
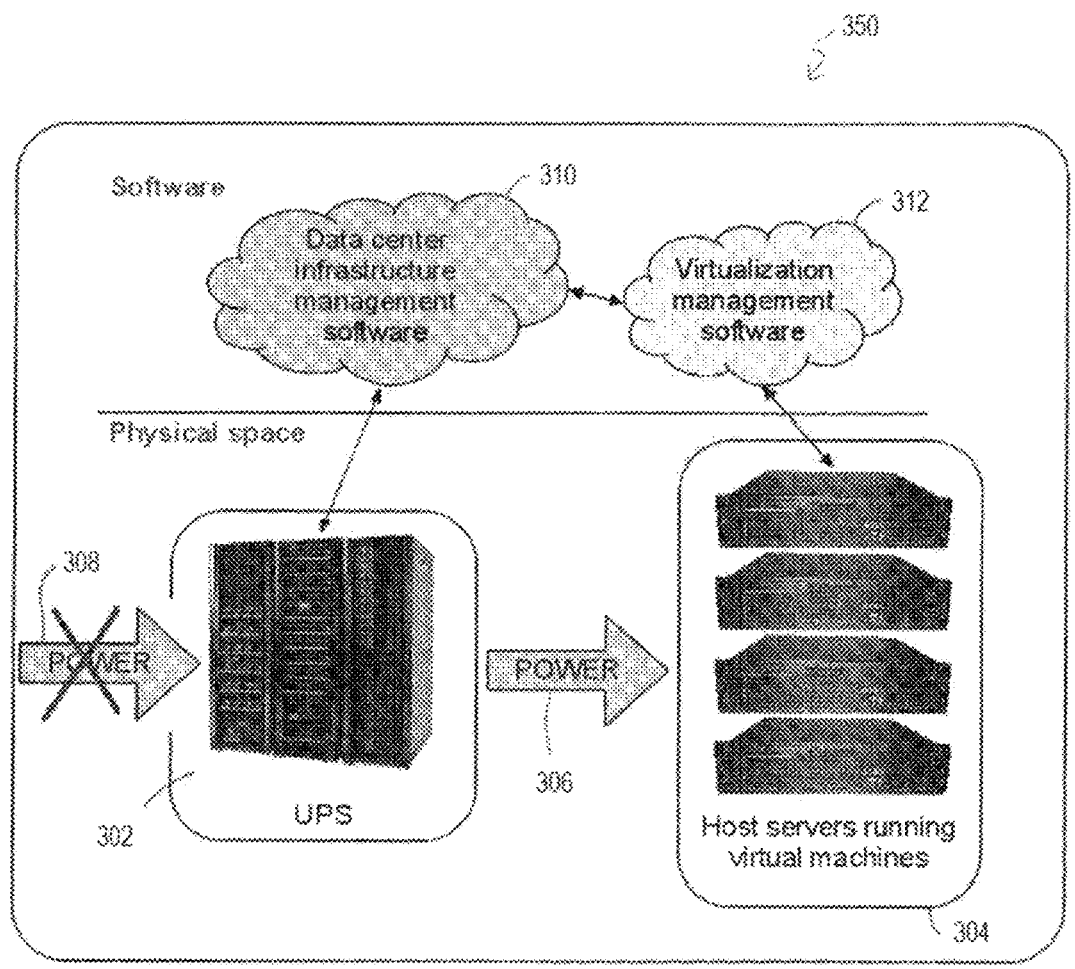
FIG. 4 is a schematic block diagram showing an uninterruptible power supply and data center servers.
Figure 5:
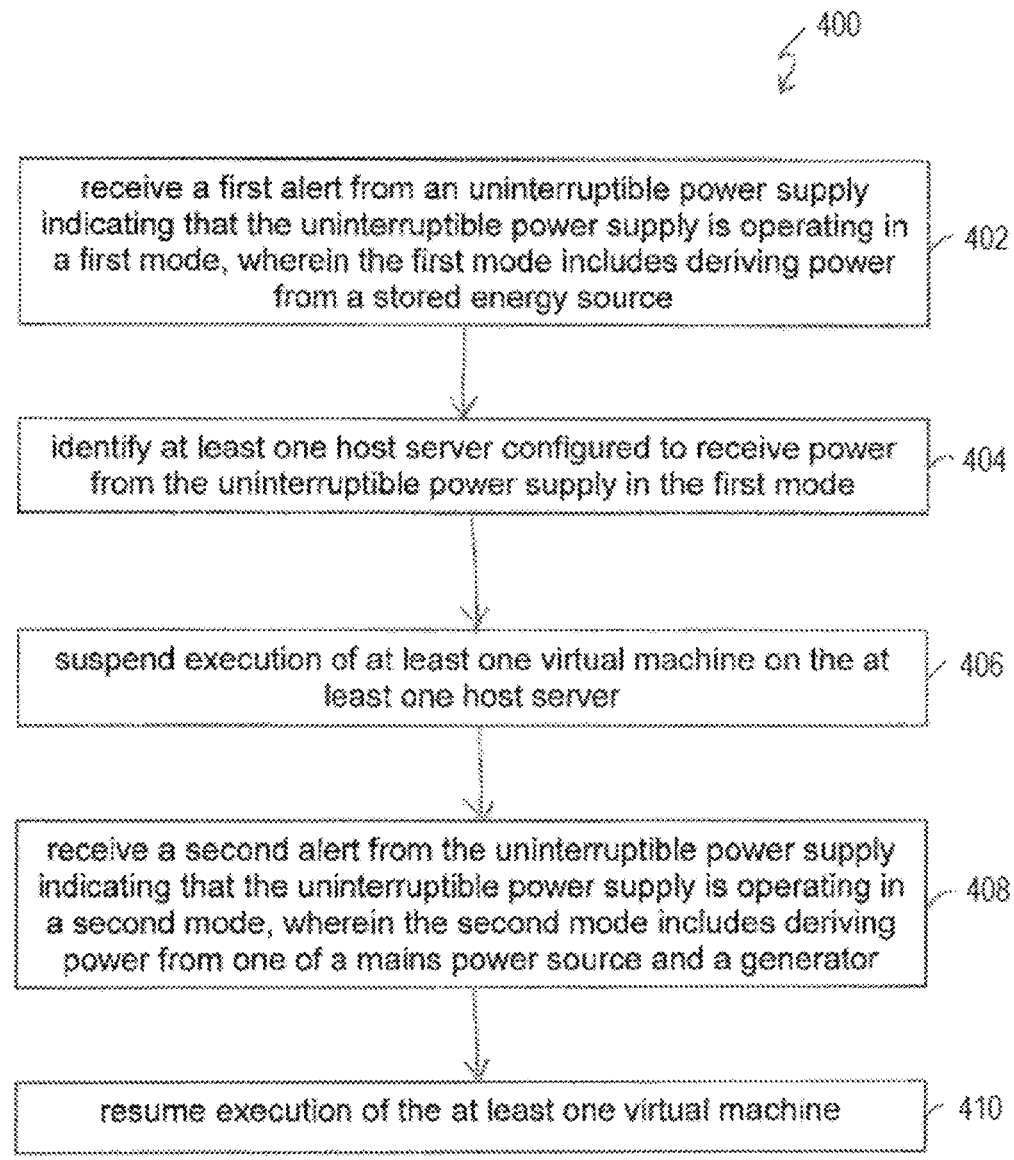
FIG. 5 is a flow chart of a method of reducing the amount of energy storage in a data center.

FIG. 4 is a schematic block diagram 350 showing the UPS 302 and the data center servers 304 after disruption of input power 308. As indicated by the "x" over the power arrow 308, the UPS 302 has lost input power, and is providing power 306 to the data center servers 304 from a stored energy source. Upon detection of the disruption of input power 308, the management server running the data center infrastructure management software 310 controls the host servers 304 to operate in a reduced power mode of operation as will now be described with reference to FIG. 5, which includes a flow chart of a method 400 for reducing power requirements in a data center when operating in a backup mode of operation.

In the method 400, at block 402, the data center infrastructure management software 310 receives an alert from the UPS 302 indicating that the UPS is operating in a first, stored energy, mode. At block 404, the data center infrastructure management software 310 identifies which host servers 304 are receiving power from the UPS 302.

At block 406, the data center infrastructure management software 310 instructs the virtualization management software 312 to suspend execution of one or more virtual machines on the host servers 304 receiving power from the UPS 302. In one example, it takes less than one second for the data center infrastructure management software 310 to receive the alert from the UPS 302 and suspend execution of one or more virtual machines on the host servers 304. According to one embodiment, the data center infrastructure management software 310 may rank the importance of each virtual machine, and only suspend execution of virtual machines below a selected level of importance.

According to one feature, when execution of the virtual machines is suspended, the computational load of the host servers 304 drops to near-zero. When there is almost no computational load on the host servers 304, the host servers 304 will throttle their computational power, lowering their power draw by between about 50% to about 80%. According to one example, the decrease in the power draw by the host servers 304 depends on the server type. In another example, the decrease in the power draw by the host servers 304 depends on the server load. According to one feature, because the power draw of the host servers 304 drops by between about 50% to about 80%, the energy stored in the back-up power in the UPS 302 equates to a longer runtime. Alternatively, a UPS with a back-up power source having a shorter runtime may be used.

In one embodiment, in response to the alert from the UPS 302 indicating that the UPS is operating in the first, stored energy, mode, the data center infrastructure management software 310 activates a power-capping process in one or more of the host servers 304. The power-capping process limits the amount of power a host server can draw. In another embodiment, in response to the alert from the UPS 302 indicating that the UPS is operating in the stored energy mode, the data center infrastructure management software 310 migrates one or more operations from one or more of the host servers 304 to one or more second host servers, where the second host servers are not running in a stored energy mode.

At block 408, the data center infrastructure management software 310 receives a second alert from the UPS 302 indicating that input power has been restored to the UPS 302. In some examples, the UPS 302 may be receiving power from a mains power source, or the UPS 302 may be receiving power from a generator. At block 410, the data center infrastructure management software 310 instructs the virtual management software 312 to resume the execution of virtual machines that were previously suspended on the host servers 304 powered by the UPS.

According to one aspect, suspending virtual machines prevents data loss of applications running on the virtual machines. In one embodiment, if power is not restored within a predetermined timeframe, one or more of the suspended virtual machines may have data offloaded to persistent storage. Upon restoration of power virtual machine execution can resume immediately from the data contained in persistent storage.

In one embodiment, because the power draw of the host servers 304 drops by between about 50% to about 80% using the methods described above, less energy may be stored in batteries or other storage devices in the UPS 302. When less back-up power is required by the UPS 302, there are a wider variety of suitable back-up storage options that may be used in the UPS. In various examples, the storage options include a super capacitor, a Lithium-Ion battery, or a flywheel energy source. These alternative back-up storage options may offer several advantages. For example, the alternative backup storage devices can be run at higher temperatures with less derating, they are smaller and take up less floor space, and they weigh less than traditional lead-acid batteries. According to one example, these advantages make the alternative storage devices especially desirable for use in urban datacenters, where the cost per square foot of space is expensive.

In at least some embodiments described above, the operation of virtual machines on computer servers is suspended during operation of the computer servers from backup power. The suspension of operation will typically cause one or more applications to be suspended. In at least one embodiment, virtual machines are selected for suspension based on the applications running on the virtual machines. For example, although a particular application may be designated as a critical application, suspension of the application during a transition from mains power to generator power may nonetheless be acceptable, and more desirable than terminating the application.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A method for reducing a need for stored power in a backup mode of operation in a data center, comprising:
    associating, by a data center management system, a plurality of host servers with a plurality of uninterruptible power supplies, each of the plurality of host servers being associated with at least one of the plurality of uninterruptible power supplies from which the respective host server is configured to receive power;
    receiving, by the data center management system, a first alert from a respective one of the plurality of uninterruptible power supplies indicating that the respective uninterruptible power supply is operating in a first mode, wherein the first mode includes deriving power from a stored energy source;
    identifying, by the data center management system, at least one of the plurality of host servers, the at least one host server being configured to receive power from the respective uninterruptible power supply in the first mode;
    establishing, by the data center management system, a network communication with the at least one host server;
    identifying, by the data center management system, at least one virtual machine executing on the at least one host server;
    instructing, by the data center management system via the network communication, the at least one virtual machine on the at least one host server to suspend execution;
    receiving, by the data center management system, a second alert from the respective uninterruptible power supply indicating that the uninterruptible power supply is operating in a second mode,
    wherein the second mode includes deriving power from one of a mains power source and a generator; and
    instructing, by the data center management system via the network communication, the at least one virtual machine to resume execution.

2. The method of claim 1, further comprising, in response to the first alert, migrating operations on the at least one host server to at least one second host server.

3. The method of claim 1, further comprising activating a power-capping process in the at least one host server.

4. The method of claim 1, wherein the at least one virtual machine includes a plurality of virtual machines, and wherein the method further comprises:
    calculating a level of importance for each of the plurality of virtual machines; and
    suspending execution of a portion of the plurality of virtual machines, based on the level of importance of each virtual machine.

5. The method of claim 1, wherein deriving power from a stored energy source includes deriving power from one of a super capacitor, a lithium ion battery, a flywheel energy source, and a lead-acid battery.

6. The method of claim 1, wherein identifying at least one host server configured to receive power from the respective uninterruptible power supply in the first mode includes identifying at least one host server having a frequency-scaling processor.

7. A system for reducing a need for power in a backup mode of operation in a data center, comprising:
    an uninterruptible power supply including a stored energy source configured to generate first and second alerts indicating respectively first and second modes of operation;
    a plurality of host servers, each host server including at least one virtual machine;
    a data center management system coupled to the uninterruptible power supply and the plurality of host servers, configured to:
        receive the first alert from the uninterruptible power supply indicating that the uninterruptible power supply is operating in the first mode, wherein the first mode includes deriving power from the stored energy source;
        identify at least one of the plurality of host servers configured to receive power from the uninterruptible power supply in the first mode;
        establish a network communication with the at least one of the plurality of host servers;
        identify at least one virtual machine on the at least one of the plurality of host servers; and
        instruct, in response to the first alert, the at least one virtual machine on the at least one of the plurality of host servers to suspend execution.

8. The system of claim 7, wherein the data center management system is further configured to:
    receive the second alert from the uninterruptible power supply indicating that the uninterruptible power supply is operating in the second mode, wherein the second mode includes deriving power from one of a mains power source and a generator; and
    instruct the at least one virtual machine to resume execution.

9. The system of claim 7, wherein the stored energy source is one of a super capacitor, a lithium-ion based energy source, a flywheel energy source, and a lead-acid battery.

10. The system of claim 7, wherein the data center management system is further configured, in response to the first alert, to migrate operations on the at least one host server to at least one second host server.

11. The system of claim 7, wherein the at least one virtual machine includes a plurality of virtual machines, and wherein the data center management system is further configured to:
    calculate a level of importance for each of the plurality of virtual machines; and
    suspend execution of a portion of the plurality of virtual machines, based on the level of importance of each virtual machine.

12. The system of claim 7, wherein the at least one host server has a frequency-scaling processor.

13. The system of claim 7, wherein the data center management system is further configured to activate a power-capping process in the at least one host server.

14. A non-transitory computer readable medium having stored thereon sequences of instruction for reducing a need for power in a backup mode of operation including instructions that will cause a data center management system to:
    associate a plurality of host servers with a plurality of uninterruptible power supplies, each of the plurality of host servers being associated with at least one of the plurality of uninterruptible power supplies from which the respective host server is configured to receive power;
receive a first alert from a respective one of the plurality of uninterruptible power supplies indicating that the respective uninterruptible power supply is operating in a first mode, wherein the first mode includes deriving power from a stored energy source;
identify at least one of the plurality of host servers configured to receive power from the respective uninterruptible power supply in the first mode;
establish a network communication with the at least one of the plurality of host servers;
identify a plurality of virtual machines in operation on the at least one of the plurality of host servers; and
calculate a level of importance for each of the plurality of virtual machines on the at least one of the plurality of host servers;
instruct, via the network communication, based on the level of importance of each virtual machine, at least one virtual machine from the plurality of virtual machines on the at least one of the plurality of host servers to suspend operation in response to the first alert.

15. The computer readable medium of claim 14, further comprising instructions that will cause the data center management system to:
receive a second alert from the respective uninterruptible power supply indicating that the respective uninterruptible power supply is operating in a second mode, wherein the second mode includes deriving power from one of a mains power source and a generator; and
instruct, in response to the second alert, the at least one virtual machine to resume execution.

16. The computer readable medium of claim 14, further comprising instructions that will cause the data center management system, in response to the first alert, to migrate operations on the at least one host server to at least one second host server.

17. The computer readable medium of claim 14, wherein deriving power from a stored energy source includes deriving power from one of a super capacitor, a lithium ion battery, a flywheel energy source, and a lead-acid battery.

18. The computer readable medium of claim 14, further comprising instructions that will cause the data center management system to activate a power-capping process in the at least one host server.

* * * * *